2,844,476
Patented July 22, 1958

United States Patent Office

2,844,476

PROCESS OF COMMINUTING AND DEHYDRATING FOODS

Eugene J. Rivoche, Washington, D. C.

No Drawing. Application July 29, 1953
Serial No. 371,155

4 Claims. (Cl. 99—199)

This invention relates to the comminuting and dehydration of fruits and vegetables, such as potatoes, carrots, beets, apricots, apples, etc. and also of meats and fish, and more particularly relates to the comminuting of such foods without fracture or destruction of the food grains, and the dehydration of such foods without discoloration, oxidation or contamination.

In previous comminuting and dehydration of food products, such as for instance potatoes, the food products have been comminuted by various expedients such as by hammer mills, ball mills and sieving processes which by a rubbing, abrasive, crushing, milling action have to a greater or lesser extent fractured the elemental food grains. The fine powder thus produced is then conventionally dried by means of an air spray, centrifugal spray or cyclone drier. According to other processes the food products were frozen prior to the powdering step and then abraded while in a frozen state. Since the frozen foods are very brittle, this action has resulted in a large scale destruction of the elemental food grains which causes the product upon reconstitution to assume an undesirable form which has taste and organoleptic characteristics very different from those of the fresh food products. According to other processes the food products have been frozen and then thawed and subjected to a comminuting action while the food particles were borne by a cold liquid. The comminuted food particles, still borne by the liquid, were then fed to a fast drying apparatus such as a spray drier. Again the disadvantage of elemental grain cell fracture or destruction was encountered.

A still further means of comminuting and drying starchy foodstuffs consisted of a batch process wherein cooked and partially dehydrated vegetables were cooked and then intermixed with a previously prepared dry powder of the same vegetable to reduce the moisture content of the mixture. According to that process the foodstuff was pre-dried and then introduced into a drum where it was cooked and subsequently cooled. When the foodstuff had reached a sufficiently low temperature and possessed the necessary moisture content for comminuting, approximately 50%, it was vigorously stirred in the drum until a damp powder was produced. Alternately a previously prepared food powder was introduced after the cooling and prior to the stirring in order to aid in producing the requisite moisture content. After the comminution, heat was applied to the drum until the powder therein was substantially dry. A large percentage of the yield of one operation was used as the dry powder for the following batch.

This process suffers from several disadvantages. It is first of all a batch process and is unsuited to economic large scale production. The use of previously prepared powder in each batch results in the final product containing a high percentage of powdered foodstuff which has been repeatedly hydrated and dehydrated, heated and cooled, and this repeated operation upon the foodstuff greatly deteriorates its quality.

It is, therefore, an object of this invention to comminute and dehydrate foodstuffs by means of a continuous process using a very gentle abrading action which does not fracture or destroy the elemental grain particles.

It is a further object of the invention to produce a comminuted dehydrated food product without repeatedly hydrating and dehydrating a substantial percentage of the product.

It is a further object of this invention to provide a food dehydrating process wherein protection against contamination, discoloration and oxidation is provided without the necessity for saturating large volumes of air with preservative, bleaching and sterilizing agents.

It is a further object of this invention to powder and dehydrate food products while imparting thereto any desired preservatives, coloring agents, flavors or vitamins.

It is a still further object of this invention to provide a method of powdering meats and fish which will cause a separation of the meat cells from the fiber tissues, blood vessels, nerves, bones, etc.

It is a still further object of the invention to comminute and dehydrate food products by a process wherein the flavors usually lost in cooking or drying processes are retained in the finished product.

According to the method of the invention the food products are subjected to a partial pre-drying step wherein an initial quantity of moisture is removed so as to leave in the food products substantially only that moisture necessary for proper cooking. This partial drying should be carried out while avoiding physical damage to the foodstuffs although no special apparatus is required. Any suitable drying means may be utilized, such as for example, air stoves, steam ovens and the like. As an alternative the food products may be frozen and then thawed and the thawed foodstuffs then subjected to a mechanical water separating process such as through a squeezing or mashing operation or through centrifuging.

Following this pre-drying step the food products may be subjected to a rehydrating or impregnation operation wherein some of the moisture originally removed from the foodstuffs is allowed to be reabsorbed. Prior to such reabsorption, however, the moisture which is to be taken up by the foodstuffs is saturated with the desired concentrations of preservatives, antioxidants, flavorings, colorings, vitamins, etc. so as to impart to the foodstuffs the desired characteristics. Where this impregnation step is utilized, the pre-drying step may be carried to a greater extent than where it is not utilized since the rehydration or impregnation can be relied upon to supply the foodstuffs with sufficient moisture for the cooking operation. Following the pre-drying with or without rehydration, the foodstuffs are then cooked in a conventional manner.

After the food products have been cooked they are frozen and reduced to a temperature of approximately 10 to 20° F. and are introduced into a rotating kiln or a shaker kiln of a conventional type which may, for instance, be heated by external means or by internal hot air or both. While the freezing operation might be performed in any desired manner it has been found desirable to previously mix the foodstuff with a powder in order to prevent the formation of excessively large blocks of frozen foodstuffs. Prior to introduction into the comminuting and drying kiln this powder is separated from the foodstuff and re-used. Upon initiating the continuous process, heated dried food power, such as a powder made from the food being processed, is introduced into the kiln with the frozen foodstuff in a weight ratio of approximately 1 to 1 and preferably higher. After this initial charge of dry food powder has been introduced into the kiln no more powder is introduced but the rate of input of the frozen food product is adjusted so that upon admixture with the powder in the kiln the desired moisture content for satisfactory comminuting is produced. This moisture content varies somewhat with the material being comminuted but is approximately 50%. As the frozen food product comes into contact with the heated dried powder a thawing action occurs at the surface of the food particles and as the food particles are tumbled about in the rotating kiln with the dried powder originally introduced into the kiln and with the powder subsequently produced therein, the powder exercises a gentle abrasive action on the thawing surface of the food particles. The overall moisture content of the material in the kiln varies from a maximum at the input end to a minimum at the output end and it is not necessary to recycle or re-use dried powder so that the resultant product deterioration is thus avoided. Since the surface of the food particles is thawing the elemental food grains are not brittle as would be the case where the food particles are frozen and abraded and since the abrading action exercised by the food powder is very gentle no elemental grain particle destruction is occasioned as would be the case with abrasion by hard abrasives. As the tumbling action progresses, the food particles are reduced further and further in size as successive layers thaw while the inner body of the food particles remains in a frozen condition. This gradual surface thawing of the food particles is akin to the thawing of a piece of ice in that the center of the piece of ice remains completely frozen while only the surface thaws and is removed by a dripping away of the water. In the instant case there is no drippage because the hot food powder which brings about thawing and abrasion also absorbs the moisture held by the frozen food particles. There is thus accomplished a substantially instantaneous drying through the use of the dry hot powder and the hot air.

In ordinary drying operations the moisture leaving the food particles carries with it a very large percentage of the nutritional and taste value of the food product. According to the present invention the moisture leaving the drying food is picked up by the food powder which acts as a flavor and nutrition filter. The entire comminuting and drying operation is preferably carried out in a rotating kiln which is inclined to the horizontal so that at the lower end a completely comminuted food product is discharged. It has also been found advantageous to conduct the drying in a partial vacuum and to that end the kiln may be of the conventional type equipped with vacuum producing apparatus. By impregnating the dry food powder with the desired antioxidants, sterilizing agents, etc., it is possible to further protect the food particles during the drying operation without the necessity of saturating large volumes of air with such agents.

Where the powdered food product is to be used by itself, it is desirable that the hygroscopic abrading and drying agent be comprised of the same fruit or vegetable as that product.

If, however, the product is to be used in the making of thickened soups, it is permissible to use other types of edible flour than that derived from the product under treatment. Thus, it is possible that carrots, beets, and the like, where they are to be used in the making of soups, can be dried by the use of potato flour or wheat flour, or any other edible starch material which is not objectionable in the final product. To the extent that it is present, the starch residue contributes a thickening influence in the making of soup.

Where the method of this invention is utilized in preparing powdered meats or fish, the meat or fish may be cut into suitable sized chunks or diced and these particles then placed in the revolving drum or alternately into a shaking device or other suitable agitator. Simultaneously the dry food powder or flour is also introduced into the revolving drum or shaking device and this flour may contain the desired antioxidants, preservatives, flavoring, vitamins, etc. On revolving the kiln, or agitating the material by other suitable means, the powder exercises an abrading action upon the meat or fish which literally shreds meat or fish cell particles from the fiber tissues, blood vessels and skeletal structure. Simultaneously with such abrading action the powder absorbs the moisture in the meat or fish and prevents oxidation or contamination because of the high concentration of antioxidants and anticontaminants in the powder. At the termination of the abrading process, the meat or fish cells are all in the form of a meat or fish powder, while the fibrous structure of the meat or fish remains as lumps or agglomerates which may be removed through a screening action. The meat or fish powder is thoroughly intermixed with the food powder and the mixture may be packed or sold in this form if the presence of the food powder is not objectionable, as where the meat or fish powder is to be used in soups or other food products where a thickening agent is desirable. Where it is desired to produce a meat or fish powder free of such thickening agent the dry abrading powder should consist of powdered meat or fish produced by a previously conducted operation or operations of this process. Meat powder thus produced will have a pink appetizing color and will be suitable for use in high grade meat preparations such as baby food, meat products for convalescents, etc. As in the foregoing examples, the food powder acts as a flavor filter and in absorbing the moisture from the meat also absorbs the flavors and nuritional values which ordinarily are lost.

Whereas the foregoing powdering of meat or fish was carried out without a freezing step, it is to be understood that the meat or fish chunks or dice may be frozen and the frozen particles then added to the rotating kiln or shaker as in the preceding treatment of potatoes. Also as in the foregoing process, a food powder is simultaneously introduced into the kiln or shaker in order to bring about the desired comminution and dehydration of the meat. The rate of thawing may be adjusted through adjustment of the temperature of the food powder and as in the preceding process, the resulting powdered product may be separated from the fibrous remains of the meat structure through a screening or similar operation. It has been discovered that where the food product is thus frozen prior to the drying step it is unnecessary to add any large amounts of antioxidants or anticontaminants to the process since the meat is transformed substantially instantaneously from a frozen state to a dry state thereby minimizing any oxidation or contamination.

While the use of food powders as filters has been described in connection with the foregoing processes, it is to be understood that filters of this type may be used in many different environments. Thus in those food industries where highly flavored vapors are produced and merely lost to the atmosphere it is possible to provide flavor filters by forcing such vapors through a bed of suitable food powder or flour. This powder may then be used in preparing cream soups or may be used as flavor imparting thickeners or in other flavoring capacities.

Whereas this invention has been described in terms of specific apparatus and specific steps it is to be understood that this has been by way of illustration only and is not to be deemed limiting in any sense, the invention being limited solely by the scope and spirit of the appended claims.

I claim:

1. A method for simultaneously comminuting and dehydrating foodstuffs, comprising: freezing said foodstuffs to provide relatively large frozen pieces, subjecting the surfaces of said frozen pieces to continuous absorptive and abrasive action by agitating said pieces in contact with at least approximately equal proportions by weight of relatively dry hygroscopic food powder while said surfaces are at substantially freezing temperature and the interiors of said pieces are below freezing temperature, and continuing the agitation of said frozen pieces with said food powder to continuously abrade particles from the frozen pieces and expose, thaw, and dehydrate layer after layer of the frozen pieces.

2. The method defined in claim 1 wherein the foodstuffs prior to freezing are partially dehydrated and are partially rehydrated with a liquid containing edible additives.

3. The method as defined in claim 1 wherein said food stuffs prior to freezing are partially dehydrated, impregnated with water containing at least one edible additive, and are cooked.

4. A continuous method for simultaneously comminuting and dehydrating foodstuffs having a relatively high moisture content, comprising: freezing said foodstuffs to provide relatively large frozen pieces; introducing a portion of said frozen pieces into one end of a heated tumbling zone along with at least an approximately equal proportion by weight of a hot, substantially dry, hygroscopic food powder; tumbling said frozen pieces in said zone in contact with said food powder so that as the surfaces of said pieces are thawing they are subjected to the water-absorptive and abrasive action of said food powder, said abrasive action producing additional food powder from the relatively large frozen pieces; continuously removing relatively dry food powder from the tumbling zone, and introducing further portions of frozen food pieces into said tumbling zone.

References Cited in the file of this patent

UNITED STATES PATENTS

| | | |
|---|---|---|
| 634,200 | Cummer | Oct. 3, 1899 |
| 1,157,935 | Gray | Oct. 26, 1915 |
| 1,979,124 | Tival | Oct. 30, 1934 |
| 2,388,917 | Hormel | Nov. 13, 1945 |
| 2,439,119 | Willets et al. | Apr. 6, 1948 |
| 2,520,891 | Rivoche | Aug. 29, 1950 |
| 2,572,761 | Rivoche | Oct. 23, 1951 |
| 2,572,762 | Rivoche | Oct. 23, 1951 |
| 2,740,721 | Hice et al. | Apr. 3, 1956 |

FOREIGN PATENTS

| | | |
|---|---|---|
| 32,321 | Great Britain | Dec. 15, 1939 |